D. WILSON.
GEARING FOR WINCHES.
APPLICATION FILED MAY 11, 1908.

1,007,761.

Patented Nov. 7, 1911.

Witnesses.
W. Scott
J. H. Prell

Inventor.
David Wilson
By his Attorney
A. J. Davies.

COLUMBIA PLANOGRAPH CO., WASHINGTON, D. C.

UNITED STATES PATENT OFFICE.

DAVID WILSON, OF SEACOMBE, ENGLAND.

GEARING FOR WINCHES.

1,007,761.  Specification of Letters Patent.  Patented Nov. 7, 1911.

Application filed May 11, 1908.  Serial No. 432,287.

*To all whom it may concern:*

Be it known that I, DAVID WILSON, a subject of Great Britain, residing at Seacombe, in the county of Chester, England, have invented certain new and useful Improvements in Gearing for Winches, of which the following is a specification.

This invention relates to improvements in the mode of coupling up the driving gear of a steam winch whereby a more silent running of the gear may be obtained.

The invention consists essentially in the substitution of sprocket wheels and chains in place of the usual direct coupling of gear wheels.

Figure 1:
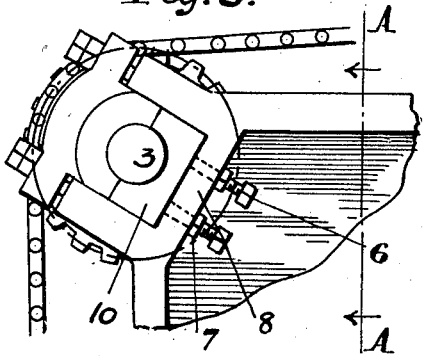
Figure 1:
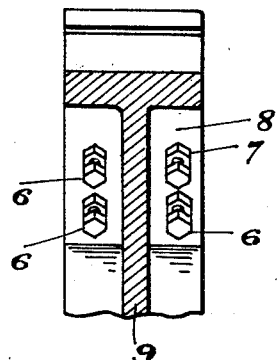
Figure 1:
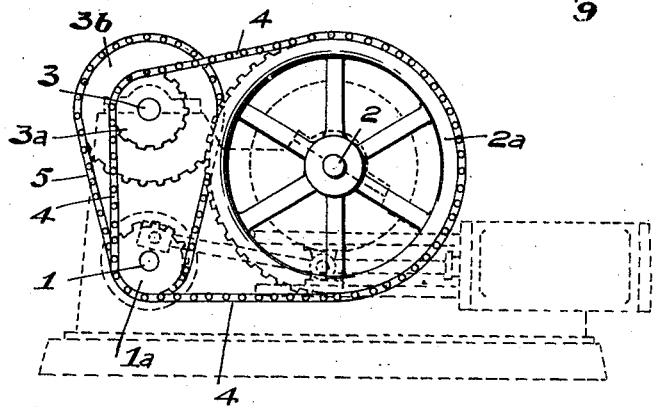
Figure 2:
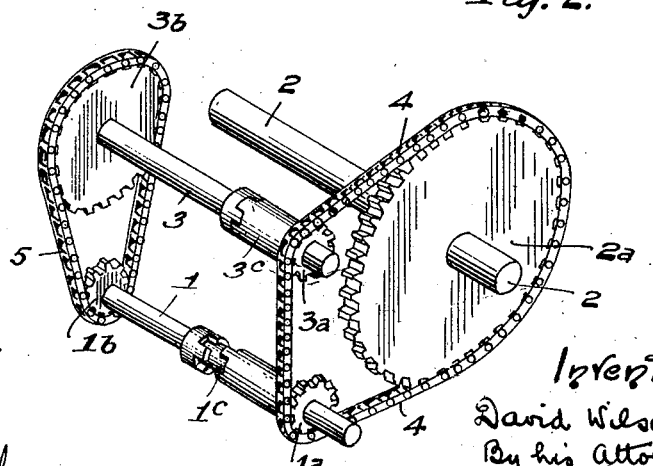

An application of the invention to one type of steam winch is shown in the accompanying drawings, in which, Figure 1. is a side view of a winch, with primary and secondary drive mechanisms, fitted with the improvements, the winch being indicated in dotted lines. Fig. 2. is a diagrammatic perspective view showing the arrangement of chain gear for this type of winch. Fig. 3. is an enlarged detail side view of a type of bearing specially suitable for this invention and adapted to take up the slack of the chains. Fig. 4. being an end section of Fig. 3. on the line A—A.

In the drawings 1 is the driving shaft, 2 the driven shaft, and 3 the intermediate shaft, all as usually fitted to a winch, but instead of the pinions $3^a$ and $1^a$, on the intermediate and driving shafts respectively, gearing as usual directly with the gear wheel $2^a$ on the driven shaft, these shafts are provided with sprocket pinions and wheel, and a continuous chain 4 is provided to couple the pinions $3^a$ and $1^a$ with the driven sprocket wheel $2^a$ on the driven shaft. Similarly the secondary pinion $1^b$ on the driving shaft and the sprocket wheel $3^b$ on the intermediate shaft for the secondary drive mechanism, instead of gearing together directly as usual, are separated and coupled in gear by the chain 5.

The usual clutch motions, $1^c$ and $3^c$ are of course provided for disconnecting the pinions $1^a$ and $3^a$ from their respective driving shafts when changing from primary to secondary drive mechanism, and vice versa. The primary drive mechanism being by way of the driving shaft 1, pinion $1^a$, chain 4 to the driven sprocket wheel $2^a$, the pinion $3^a$ being disconnected. The secondary drive mechanism being by way of the driving shaft 1, secondary pinion $1^b$, chain 5, sprocket wheel $3^b$ intermediate shaft 3, pinion $3^a$, and chain 4 to the sprocket wheel $2^a$, the pinion $1^a$ being disconnected from its shaft 1. Instead of the single chain drives 4 and 5 respectively as shown, these drives may be made with twin chains in each case, the teeth of the sprocket wheels and their pinions being also duplicated. In this way a greater degree of safety is insured than would be the case with single chain drives.

By constructing the bearings of one or both of the shafts 1 and 3 as shown in Figs. 3. and 4. any slackness of the chain which may develop with use may be taken up. The bearings of the intermediate shaft 3 are preferably made adjustable in this way, a pair of bolts 6 provided with lock nuts 7 being threaded into the lower housings 8 of the bearings on each side of the frame web 9. By actuating the bolts the lower step 10 of the bearing may be raised in its housing and the chain consequently tightened up. Instead of the bolts 6 bearing directly against the bottom step, a hard steel plate is preferably disposed between the step and the bolt ends.

Claim:

A gearing, said gearing comprising a driving shaft, a clutch mounted on said driving shaft, a toothed pinion rigidly mounted on one extremity of said shaft, a toothed pinion loosely mounted on the opposite extremity of said shaft adapted to be operated by the said clutch, auxiliary shafts, a large toothed pinion rigidly mounted on one extremity of one of said auxiliary shafts, a clutch on the opposite end of said shaft, and a relatively small toothed pinion on the said shaft adapted to be operated by said clutch, a second auxiliary shaft having a large toothed pinion mounted on one end thereof, and chains for connecting said pinions.

In testimony whereof I affix my signature in presence of two witnesses.

DAVID WILSON.

Witnesses:
 A. J. DAVIES,
 J. H. PRELLE.

---

Copies of this patent may be obtained for five cents each, by addressing the " Commissioner of Patents, Washington, D. C."